United States Patent
Carter et al.

(10) Patent No.: US 7,694,315 B2
(45) Date of Patent: Apr. 6, 2010

(54) SCHEMA-BASED MACHINE GENERATED PROGRAMMING MODELS

(75) Inventors: Eric H. Carter, Kirkland, WA (US); Andrew J. Clinick, Issaquah, WA (US); Robert E. Lippert, Seattle, WA (US); Mohit Gupta, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1370 days.

(21) Appl. No.: 10/779,510

(22) Filed: Feb. 13, 2004

(65) Prior Publication Data

US 2005/0183097 A1    Aug. 18, 2005

(51) Int. Cl.
  *G06F 3/00*   (2006.01)
  *G06F 9/44*   (2006.01)
  *G06F 9/46*   (2006.01)
  *G06F 13/00*  (2006.01)
(52) U.S. Cl. .................................................. 719/328
(58) Field of Classification Search ................... 719/328
  See application file for complete search history.

(56) References Cited

U.S. PATENT DOCUMENTS

| | | | | |
|---|---|---|---|---|
| 5,604,896 A * | 2/1997 | Duxbury et al. | ............... | 703/26 |
| 5,619,685 A * | 4/1997 | Schiavone | ................... | 703/20 |
| 5,627,979 A * | 5/1997 | Chang et al. | ................ | 715/763 |
| 5,689,711 A * | 11/1997 | Bardasz et al. | ............... | 717/105 |
| 6,026,238 A | 2/2000 | Bond et al. | | |
| 6,151,031 A * | 11/2000 | Atkins et al. | ................ | 345/441 |
| 6,233,731 B1 | 5/2001 | Bond et al. | | |
| 6,253,257 B1 * | 6/2001 | Dundon | ...................... | 719/331 |
| 6,449,659 B1 * | 9/2002 | Caron et al. | ................ | 719/315 |
| 6,507,875 B1 | 1/2003 | Mellen-Garnett et al. | | |
| 6,609,158 B1 * | 8/2003 | Nevarez et al. | ............. | 719/316 |
| 6,631,519 B1 * | 10/2003 | Nicholson et al. | ........... | 717/169 |
| 6,637,020 B1 | 10/2003 | Hammond | | |
| 6,675,228 B1 | 1/2004 | Bahrs et al. | | |
| 6,701,487 B1 * | 3/2004 | Ogami et al. | .................. | 716/1 |
| 6,983,468 B1 * | 1/2006 | Green et al. | ................ | 719/331 |
| 7,293,253 B1 * | 11/2007 | Soukup | ...................... | 717/108 |
| 7,340,745 B2 * | 3/2008 | Waldorf | ...................... | 719/328 |

(Continued)

OTHER PUBLICATIONS

Lakshmanan et al., "On Querying Spreadsheets", Feb. 1998, IEEE, Proceedings., 14th International Conference on Data Engineering, pp. 134-141.*

Tyng-Ruey Chuang. Generic Validation of Structural Content with Parametric Modules. Proceedings of the 6th ACM SIGPLAN conference on Functional Programming, pp. 98-109, 2001.

C. Och, R. King, and R. Osborne. Integrating Heterogeneous Data Sources using the COIL Mediator Definition Language. Proceedings of the 2000 ACM Symposium on Applied Computing; pp. 991-1000, 2000.

*Primary Examiner*—Hyung S Sough
*Assistant Examiner*—KimbleAnn Verdi
(74) *Attorney, Agent, or Firm*—Workman Nydegger (57) ABSTRACT

A programming model that takes general purpose APIs and machine-generates new programming models based on user defined schemas that provide the developer with data and view separation, and a way to communicate to the host application using the domain of the problem being solved. The system comprises a schema component that the developer uses to define a schema that includes one or more domain terms related to the problem to be solved, and a mapping component that uses the schema to search and map selected constructs from one or more generic host application APIs to the corresponding problem domain terms. Once the mapping is completed, a generating component generates a new API that is used by a host application to facilitate developing an application document using terms related to the domain of the problem to be solved.

13 Claims, 9 Drawing Sheets

U.S. PATENT DOCUMENTS

| | | | |
|---|---|---|---|
| 7,370,335 B1 * | 5/2008 | White et al. | 719/328 |
| 7,509,658 B2 * | 3/2009 | Goring et al. | 719/328 |
| 7,516,439 B2 * | 4/2009 | Robinson | 717/103 |
| 2003/0163603 A1 * | 8/2003 | Fry et al. | 709/328 |
| 2004/0083465 A1 * | 4/2004 | Zhang et al. | 717/143 |
| 2004/0148612 A1 * | 7/2004 | Olsen | 719/328 |
| 2004/0193759 A1 * | 9/2004 | Scott et al. | 710/36 |
| 2004/0205692 A1 * | 10/2004 | Robinson | 717/100 |
| 2005/0097187 A1 * | 5/2005 | Thompson et al. | 709/217 |

* cited by examiner

| SPREADSHEET | | | |
|---|---|---|---|
| A | B | C | D |
| 1 | | | |
| 2 | NAME: | John Doe | |
| 3 | E-MAIL: | jdoe@company.com | |
| 4 | EMPLOYEE#: | 100231 | |
| 5 | PURPOSE: | Very important | |
| 6 | | conference | |
| 7 | DATE | Description of | Cost |
| 8 | 1-JAN | Expense | $ 20.00 |
| 9 | 2-JAN | Dinner | $ 10.00 |
| 10 | | Breakfast | $ 30.00 |
| 11 | | | |

SCHEMA-BASED MACHINE GENERATED PROGRAMMING MODELS

TECHNICAL FIELD

This invention is related to software development architectures.

BACKGROUND OF THE INVENTION

Today when a developer wants to write a program customization that extends the functionality of another program (a host), the developer must use an API (Application Program Interface) exposed by that host. This often forces the developer into dealing with things on a level understood by the host program, such as cell addresses for a spreadsheet or paragraph numbers for a word processor. This creates code that is difficult to read and maintain, since it is difficult to attach any meaning to such general constructs.

These host APIs are generic to allow maximum flexibility in the customizations that will be written against that host. The APIs also use the vocabulary of the host application, which is generic and does not typically match the terminology of, for example, the business problem being solved by the specific program customization. A customization written against the word processor API might use API objects such as "Bookmark" and "Table", while a customization written against a spreadsheet API might use API objects like "Range" and "List".

However, the customization developer might be writing an Expense Reporting customization and would prefer using terminology from that problem domain such as "Employee", "Expense", "E-Mail Address", etc. For example, consider that a programmer wants to write code that runs against a spreadsheet containing an expense report that detects when a cell containing the employee e-mail address is edited. When the e-mail address is edited, the programmer wants the application to automatically lookup the employee's employee ID and put it into another cell in the worksheet. Conventionally, the code a developer would write using the API of the spreadsheet is very generic and does not have any reference to the names or terminology in the domain of the problem being solved. Instead of talking in terms of employee e-mail address, and employee ID, the developer is forced to talk in terms of the generic spreadsheet object model and use generic objects such as Range (which represents a range of cells) and cell addresses that represent the column and row of a cell of interest.

What is needed is an improved programming model that uses the terminology of the problem being solved.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a programming model that allows a developer to create a schema and then map the elements of the schema to constructs understood by the host APIs. Essentially, the invention takes the general purpose host APIs such as those exposed by a word processing application and/or a spreadsheet application, for example, and machine-generates new programming models based on a user defined schema. The schema provides the developer with separation of data and view, and a way to communicate to the host application using the domain terminology of the problem being solved (e.g., Customer, E-Mail, and ID, instead of cell addresses or paragraph numbers). This allows the developer to write code that is expressed in terms of the concepts being utilized and leads to much more understandable and maintainable code.

In support thereof, there is provided a system that includes a schema component that the developer uses to define one or more domain terms related to the problem to be solved. The schema component interfaces to a mapping component, which mapping component uses information provided by the developer to search and map selected constructs from one or more generic host application APIs to the corresponding problem domain terms. Once the mapping is completed, the system employs a generating component to use the mapping information from the mapping component to generate a new API. The new API is then used by a host application to facilitate developing an application document using terms related to the domain of the problem to be solved.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
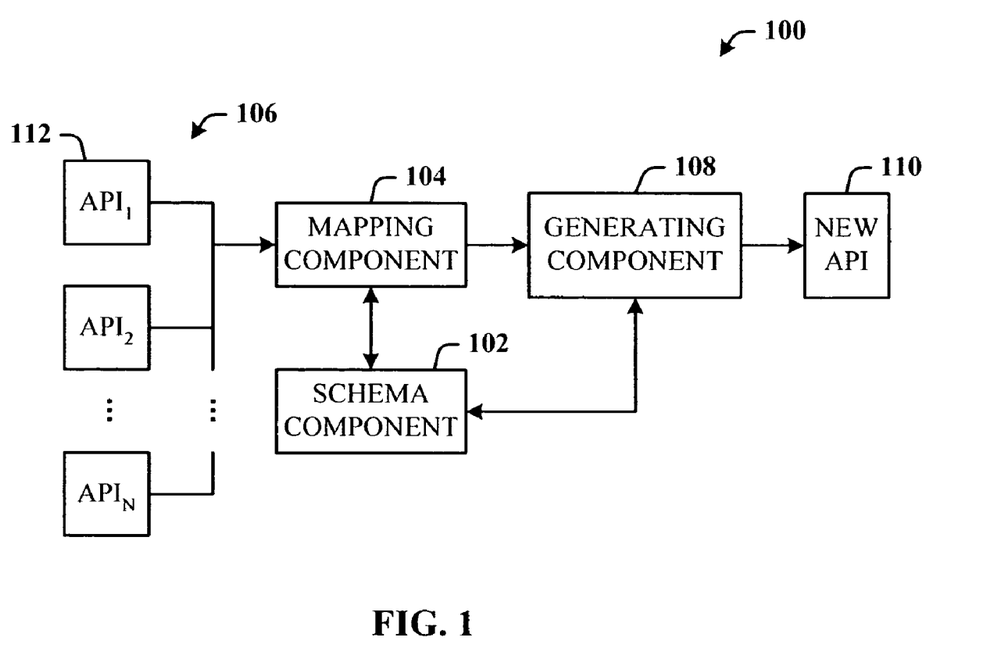
FIG. 1 illustrates a system of the present invention.

Referring now to FIG. 1, there is illustrated a system 100 of the present invention. The system 100 includes a schema component 102 that the developer uses to define one or more domain terms related to the problem to be solved. The schema component 102 interfaces to a mapping component 104, which mapping component 104 uses information provided by the developer to search and map selected constructs from one or more generic host application APIs (Application Program Interfaces) 106 to the corresponding problem domain terms. Once the mapping is completed, the system 100 employs a generating component 108 to use the mapping information from the mapping component 104 to generate a new API 110. The new API 110 is then used by a host application to facilitate developing an application document using terms related to the domain of the problem to be solved.

As indicated, the schema component 104 can include schema elements that are associated with constructs from a single generic API 112, or from more than one of the generic APIs 106 (also denoted $API_1$, $API_2$, ..., $API_N$). Note that the schema component 102 can also interface to the generating component 108 such that the generating component 108 uses the schema information and the mapping information from the mapping component to generate the new API 110. Additionally, it is to be appreciated that the schema and mapping components (102 and 104) can be combined into a single component, or further, combined with the generating component 108 in order to facilitate creation of the new API 110 in accordance with the present invention.

Figure 2:
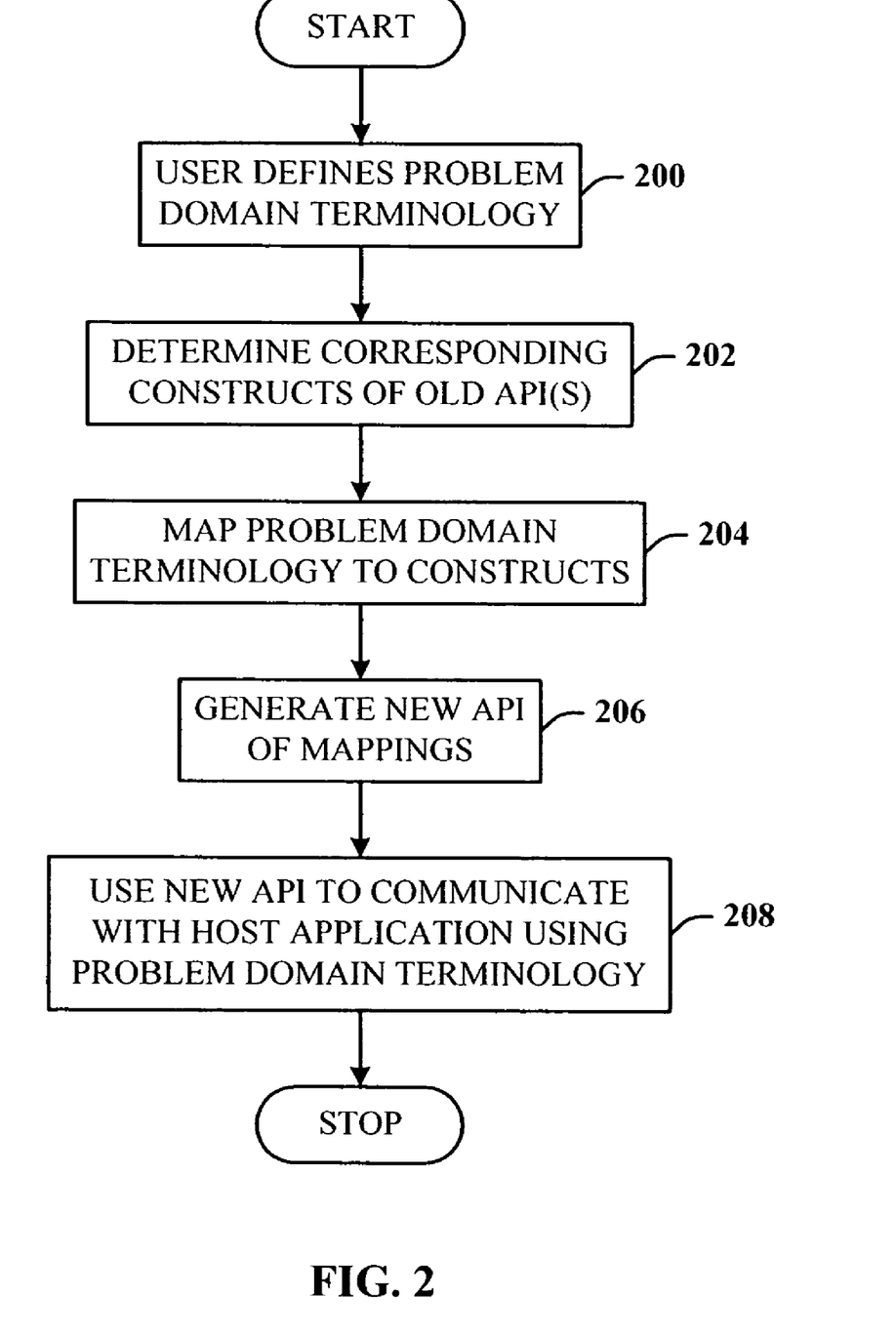
FIG. 2 illustrates a flow chart of extending the functionality of an application in accordance with the present invention.

Referring now to FIG. 2, there is illustrated a flow chart of extending the functionality of an application in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, the developer defines terminology of the problem domain. At 202, the constructs in the generic host APIs that correspond to the domain terminology are determined. At 204, the constructs are mapped to the corresponding domain terms. At 206, the new API is generated based on the mappings of the domain schema and the constructs. At 208, the new API is used by the host application to facilitate document development by the developer using terms related to the problem to be solved. The process then reaches a Stop block.

Figure 3:
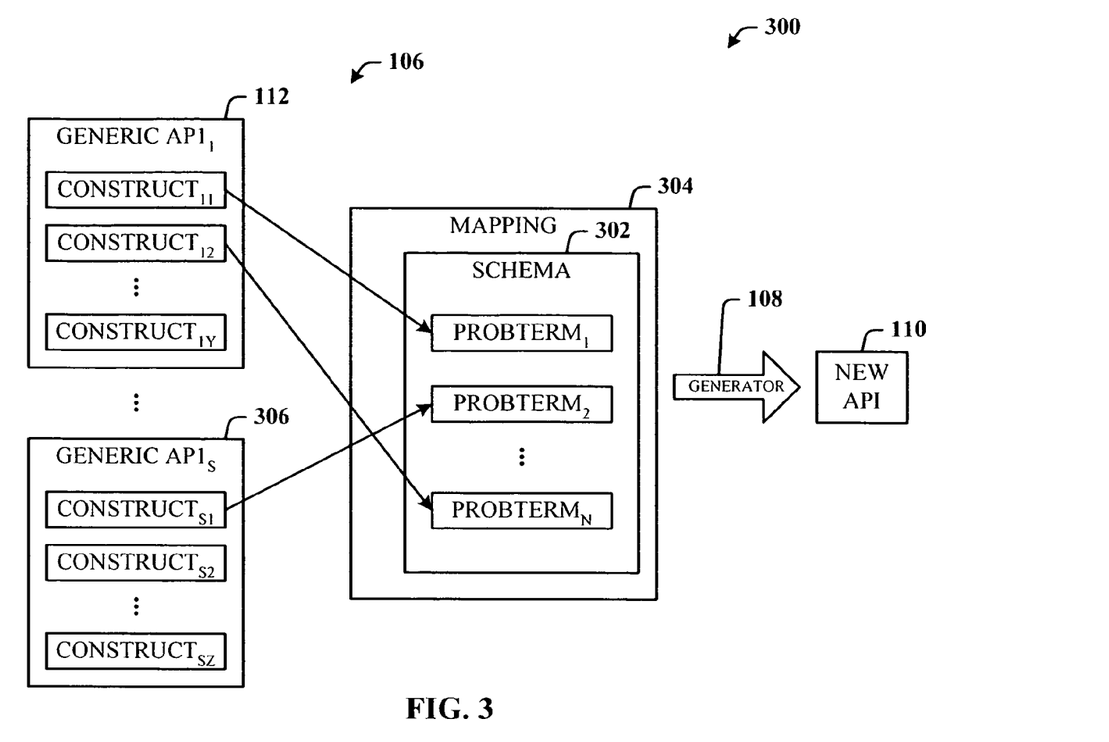
FIG. 3 illustrates a block diagram of a system that maps constructs from one or more of the generic APIs for use in generating the new API.

Referring now to FIG. 3, there is illustrated a block diagram of a system 300 that maps constructs from one or more of the generic APIs for use in generating the new API. In this implementation, the system 300 embodies a schema component 302 internal to a mapping component 304. The schema component includes a schema of problem terms (denoted as $PROBTERM_1$, $PROBTERM_2$, ..., $PROBTERM_N$) that are predefined by the developer that relate to the problem to be solved. The mapping component 304 interfaces to a plurality of the generic APIs 112 (denoted Generic $API_1$, ..., Generic $API_S$) each having a plurality of generic constructs. The first generic API 112 includes a plurality of generic constructs denoted $CONSTRUCT_{11}$, $CONSTRUCT_{12}$, ..., $CONSTRUCT_{1Y}$. The last generic API 306 (denoted Generic $API_S$) also can includes a plurality of generic constructs denoted $CONSTRUCT_{S1}$, $CONSTRUCT_{S2}$, ..., $CONSTRUCT_{SZ}$.

The disclosed architecture allows the developer to search and use generic constructs from any of the plurality of generic APIs 106. Here, the mapping is between $PROBTERM_1$ and $CONSTRUCT_{11}$, $CONSTRUCT_{12}$ and $PROBTERM_N$, and $CONSTRUCT_{S1}$ and $PROBTERM_2$. Note that many more mappings can be made.

The output of the mapping component 304 is to the generator 108 to further output the new API 110.

The disclosed architecture is not restricted to a word processing application and a spreadsheet application, but can be applied to many other types of applications, including, but not limited to ACCESS brand database software, FRONTPAGE brand website design and development software, POWERPOINT brand presentation graphics software, PROJECT brand project management software, PUBLISHER brand publication software, VISIO brand drawing software, ONENOTE brand note management software, and INTERNET EXPLORER brand browser and communication software.

Figure 4:
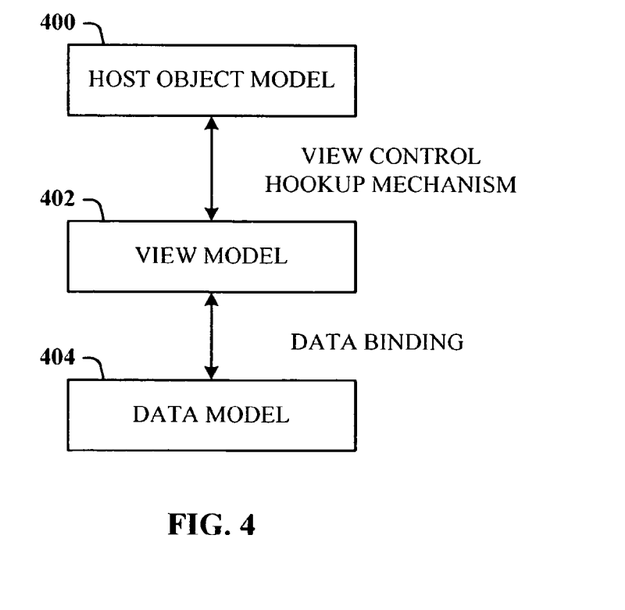
FIG. 4 illustrates a block diagram of a relationship of the host, view and data models, in accordance with the present invention.

Referring now to FIG. 4, there is illustrated a block diagram of a relationship of the host, view and data models, in accordance with the present invention. The host object model 400 is available for host compatibility and control. The view model 402 interfaces to the host model 400 via a view control hookup mechanism. The data model 404 interfaces to host object model 400 through the view model 402 via data binding to the view model 402. The view model 402 and data model 404 are schema-oriented models specific to the application being created. Sample code for each illustrates the relationships.

Host Model

---
Dim w as Worksheet
w = ThisWorkBook.Sheets(2)
w.Range("$F$11").Value2= 12345

---

View Model

---
CustomerIDCell.Value2 = 12345
CustomerIDCell.Font.Bold = True

---

Data Model

---
Customer.ID = 12345
Customers[0].FirstName = "John"
---

Following is a sample coding illustrates the relationship between the view model 402 and the host object model 400.

---
ExpenseReportView.Customer.ID.Font.Name
---

The code "ExpenseReportView.Customer. ID" is the portion generated from user-defined schema. The period (.) after "ID" is the connection between the generated view model to the correct host object model object made by using the schema to the host view element mapping information. The code "Font.Name" is a property provided by the spreadsheet application specific object model. Font is a property of the Range object that represents a cell.

Figure 5:
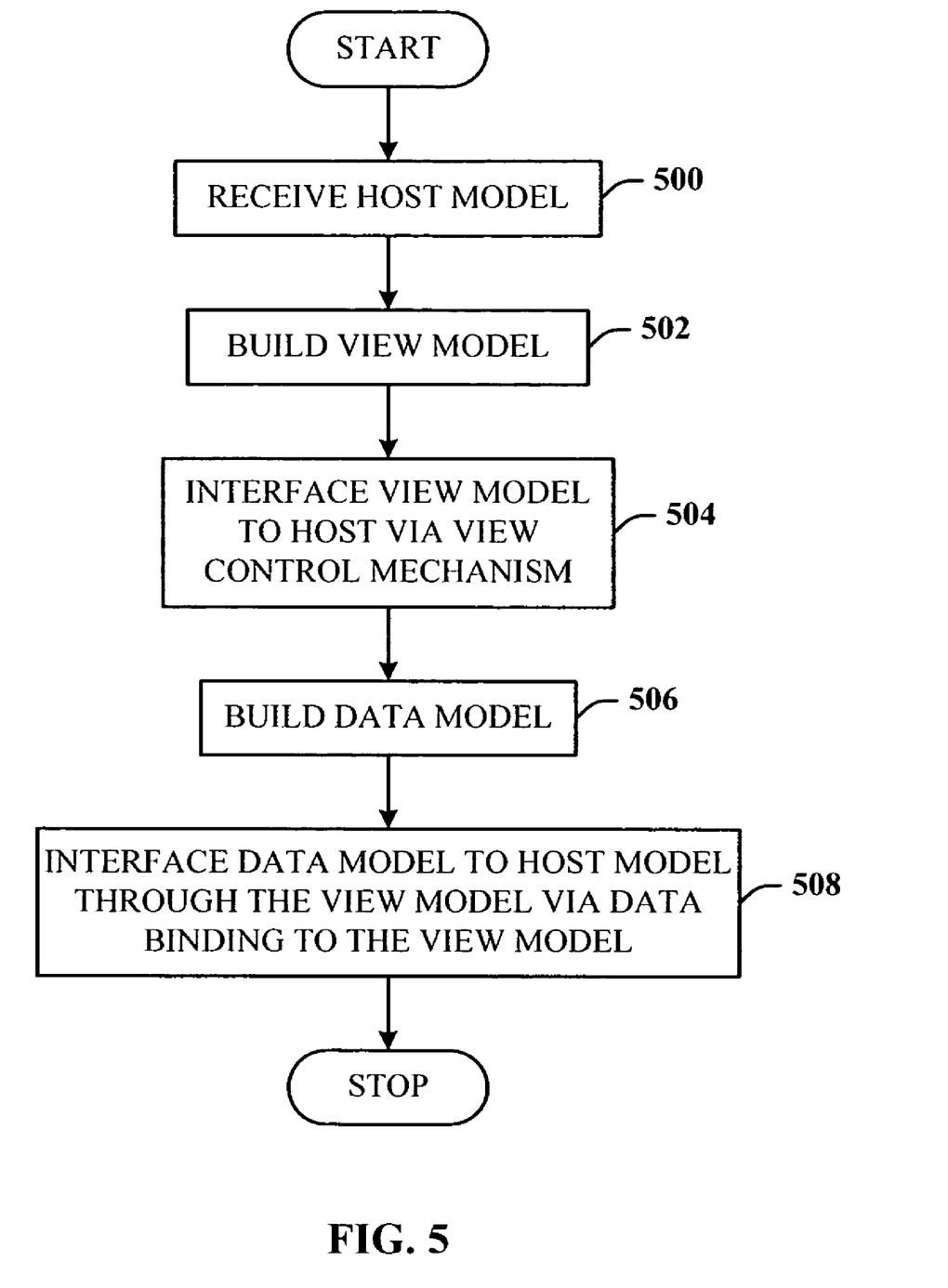
FIG. 5 illustrates a flow chart for building the relationship of FIG. 4.

Referring now to FIG. 5, there is illustrated a flow chart for building the relationship of FIG. 4. At 500, the generic host model is received. This occurs with any host application that provides generic APIs. At 502, the view model is constructed. At 504, the view model is interfaced to the host model using a view control mechanism. At 506, the data model is constructed. At 508, the data model is interfaced indirectly to the host model though the view model via data binding to the view model. The process then reaches a Stop block.

Today when a developer wants to write a program (customization) that extends the functionality of another program (host), the developer must use the API exposed by that host. For example, consider that a programmer wants to write code that runs against a spreadsheet containing an expense report that detects when a cell containing the employee's e-mail address is edited. When the e-mail address is edited, the programmer wants to automatically lookup the employee's employee ID and put it into another cell in the worksheet. The code a developer would write using the generic API of the spreadsheet might look like this.

```
Public Sub Spreadsheet_OnChange(changedRange As Range)
    If (changedRange.Address = "$A$4") Then
        changedRange.Value2 =
GetIDFromEMailAlias(Spreadsheet.Range("$B$1"))
    End If
End Sub
```

This code is very generic and does not have any reference to the names in the domain of the problem being solved. Instead of talking in terms of employee e-mail address, and employee ID, the user is forced to talk in terms of the generic spreadsheet object model and use generic objects such as Range (that represents a range of cells) and cell addresses that represent the column and row of a cell of interest. Here, "$A$4" refers to the cell with the employee's e-mail address, and "$B$1" refers to the cell with the employee's employee ID.

The disclosed invention utilizes generic, general purpose APIs and machine-generates new programming models based on user defined schemas that provide the developer with data and view separation, and a way to communicate to the host application using the domain of the problem being solved (e.g., Customer, EMail, and ID, instead of Range ("$B$1").

The disclosed architecture allows the developer to write code that functionally does the same thing as the prior example, but with naming in terms of the problem being solved, as included in the following sample code.

```
Public Sub EmployeeEmail_OnChange( )
    Employee.ID = GetIDFromEMailAlias(Employee.Email)
End Sub
```

Figure 6:
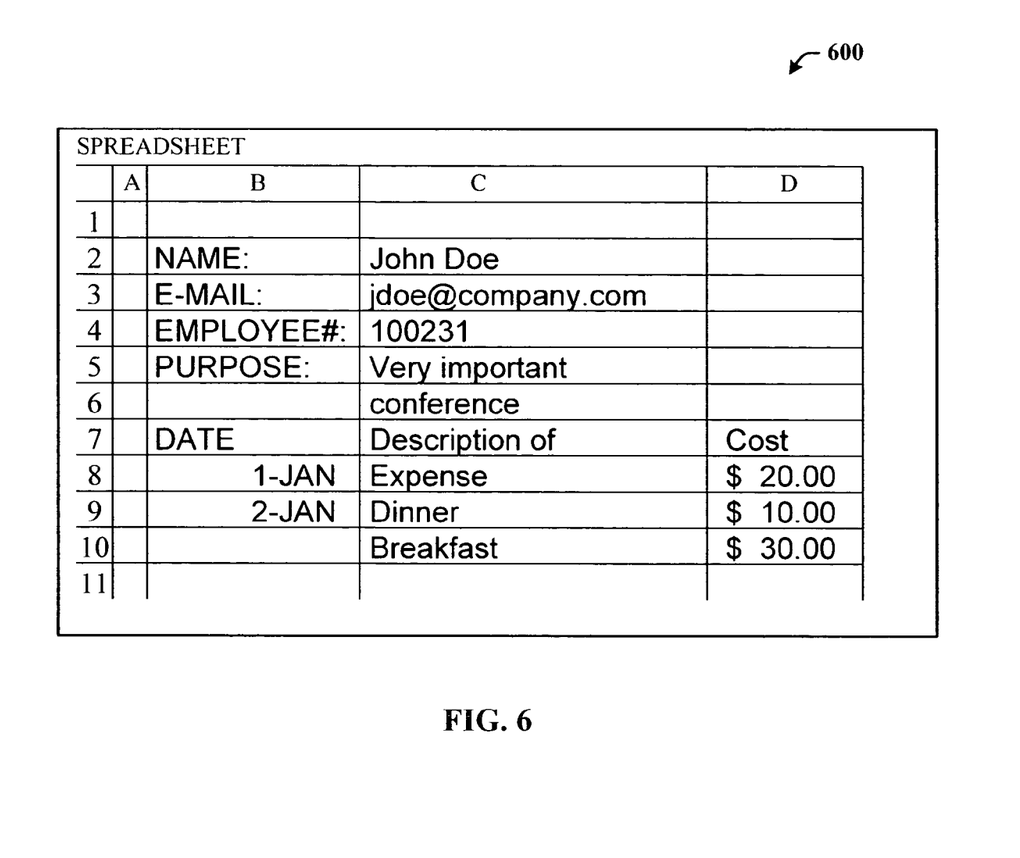
FIG. 6 illustrates a traditional expense report spreadsheet with customer information defined according to the problem to be solved.

Referring now to FIG. 6, there is illustrated a traditional expense report spreadsheet 600 with customer information defined according to the problem to be solved. The spreadsheet 600 will be used as a basis for describing an implementation of view and data models in the following figures. Consider this portion of an expense report spreadsheet shown in FIG. 6. From the perspective of the host, there is a collection of cells that contain text and formatting information. Some of that text has type constraints on it and some of the text contains formulas that manipulate the contents of other cells, but fundamentally, it is a collection of cells.

A spreadsheet model of the cells of FIG. 6 could look something like the following, as represented partially in XML (eXtensible Markup Language):

```
<Cell ID="$A$1" value="" backColor="white" fontName="Arial">
<Cell ID="$B$1" value="" backColor="white" fontName="Arial">
<Cell ID="$C$1" value="" backColor="white" fontName="Arial">
<Cell ID="$D$1" value="" backColor="white" fontName="Arial">
<Cell ID="$A$2" value="" backColor="white" fontName="Arial">
<Cell ID="$B$2" value="NAME:" backColor="white"
fontName="Arial">
<Cell ID="$C$2" value="John Doe" backColor="white"
fontName="Arial">
<Cell ID="$D$2" value="" backColor="white" fontName="Arial">
...
```

As indicated, the host model is very generic and broad to allow any type of application to be written, and does not present to the developer the notion that an expense report is being developed.

Following is a schema-based machine generated programming model for data. The developer now naturally sees the expense report in terms of the data being represented. For example, the developer's model of the data in the spreadsheet above could look like this, as represented in XML:

```
<ExpenseReport>
    <Employee>
        <Name>John Doe</Name>
        <Email>jdoe@company.com</Email>
        <EmployeeNumber>100231</EmployeeNumber>
    </Employee>
    <Purpose>Very important conference</Purpose>
    <Expenses>
        <Expense>
            <Date>1-Jan</Date>
            <Description>Dinner</Description>
            <Cost>20.00</Cost>
        </Expense>
        <Expense>
            <Date>2-Jan</Date>
            <Description>Breakfast</Description>
```

-continued

```
        <Cost>10.00</Cost>
    </Expense>
  </Expenses>
</ExpenseReport>
```

The data focused programmer does not care about the spreadsheet-specific implementation details such as the identifier "$B$2". Furthermore, a developer focused on the data does not want to think about the details of the view such as the fact that the name cell is colored, for example, white, in this instance.

For the data focused programmer, the disclosed architecture allows the developer to use a data schema and write code in terms of that data schema, rather than use the generic host API. The data focused programmer needn't think much about the view or the host API. All that is required is a design time mapping that indicates how specific instances of schematized data are mapped to application host view elements such as a cell. The developer would generate the mapping at design time (using tools) that allows generation of a new programming model. For example, the developer might create a mapping such as the following, that maps the elements from the data model (e.g., Employee Name) to generic identifiers recognized by the host (e.g., $C$2).

```
\\ExpenseReport\Employee\Name->$C$2
\\ExpenseReport\Employee\Email->$C$3
\\ExpenseReport\Employee\EmployeeNumber->$C$4
\\ExpenseReport\Employee\Purpose->$C$5
...
```

Given a data schema and mapping, a new API is generated that mirrors the data schema. The developer of the expense report can now write code against this schema-based machine generated programming model. For example, these lines of code will change the cell $C$3 to contain the name "Fred Smith" and the cell $C$4 to contain the e-mail address "fsmith@company.com". The developer using this generated programming model no longer needs to know details about the host API such as the fact that it uses an object called "Range" or identifies cells with the moniker "$A$4".

```
ExpenseReport.Employee.Name = "Fred Smith"
ExpenseReport.Employee.Email = "fsmith@company.com"
```

The developer can also take advantage of specific features of the view in an application by utilizing the view programming model. For example, consider that the developer chooses to set ExpenseReport.Employee.Name to "Fred" and wants to set the font being used to display "Fred" to bold. The level of abstraction can be increased until the programmer is manipulating concepts in the appropriate realm.

In the present invention the view abstraction and the data abstraction are built on top of the underlying host abstraction. The view abstraction allows the view developer to refer to a spreadsheet range based on its meaning within the domain of the view (e.g., to refer to a range as "NameField" rather than "Field("$B$2")"). Essentially, view data is just more schematized data to be bound to host API objects. A view developer naturally sees the expense report in terms of the view being represented. For example, the developer's model of the view in the spreadsheet above might look like this, represented partially in XML:

```
<ExpenseReportView>
  <NameLabel>
    <Text>Name:</Text>
    <BackColor>White</BackColor>
  </NameLabel>
  <NameField>
    <Text>John Doe</Text>
    <BackColor>White</BackColor>
  </NameField>
  <EMailLabel>
    <Text>E-Mail:</Text>
    <BackColor>White</BackColor>
  </EMailLabel>
  ...
```

Although there are similarities in this view schema to the host schema and API described earlier, the view schema using names that are in the domain of the problem being solved. Moreover, the view schema only names cells of interest, whereas the host schema and API name all cells.

For the view focused programmer, the developer can use a view schema to pull objects of interest out of vast collections of host API provided objects and turn these objects of interest into first class named objects called "View Controls". All that is required is a design time mapping that indicates how specific instances of schematized data are mapped to application host API objects, such as a cell. The mapping allows the generation of a view programming model. For example, the mapping created could look the following, that maps the elements from the view model (e.g., NameLabel) to identifiers recognized by the host (e.g., $B$2).

```
\\ExpenseReportView\NameLabel->$B$2
\\ExpenseReportView\NameField->$C$2
\\ExpenseReportView\EMailLabel->$B$3
...
```

Given a view schema and mapping of the schema, a new view API is machine generated that mirrors the view schema. The developer of the expense report can now write code against this schema-based machine generated programming model. For example, these lines of code will change the cell $B$2 to be blue and the cell $B$3 to be green, yet the developer using this generated programming model no longer needs to know details about the host API such as the fact that it uses an object called "Range" or identifies cells with the moniker "$A$4".

```
ExpenseReportView.NameLabel.BackColor = Blue
ExpenseReportView.NameField.BackColor = Green
```

The machine-generated view API is a hybrid of the user defined view schema and the host provided API. For example, assume that NameLabel is mapped to a spreadsheet cell. The spreadsheet can already provide an object model for a Cell via a COM object that represents a cell. The development environment hooks the host specific object model to the leaf nodes of the generated from user defined view schema object model.

The data model connects indirectly to the host API via the view model. That is, the mapping for the data to connect to the host could look like the following.

```
\\ExpenseReport\Employee\Name->\\ExpenseReportView\NameField->
$C$2
...
```

The connection between data and view model is made via a data-binding mechanism that the developer can see in their code. To do this, any view control can be configured to be data bindable using the data binding functionality and syntax provided by data binding. Thus, a developer inspecting the machine generating programming model might see the following lines of code that hookup the schema based data programming model to the view (where the code connects the NameField view control to the Employee.Name data model item).

```
ExpenseReportView.NameField.DataBindings.Add("Text",
EmployeeData, "Name")
```

There are several reasons to keep data separate from the document content. Keeping the data in the document content requires that each data element be mapped to a document view element. In reality, there is often data that is desired to be maintained and manipulated, but not displayed or stored in the document content. For example, an employee ID may be desirable in the data model but not actually displayed it in the document contents or in the view model. Moreover, many applications have document file formats that are not transparent or are very difficult to retrieve data from if the host application is not running. Typically, the host application must be run to read or modify data that is contained in the document content. This is inefficient for scenarios such as server scenarios where a web page needs to quickly retrieve and display important data in a document but does not need or want to start the entire host application to get the data from the document.

Developers want to deal directly with data and not have to start the host application to read data from document content. Given a schema for the data in the document, the present invention automatically separates the data from the view by generating and saving a data island in the document that conforms to the data schema created by the developer. The data island can be accessed and modified on the server without having to start the host application.

Each time the document runs inside the host application, the contents of this data island are synchronized with the document contents. Additionally, the generated data model is connected to the data island so that the data model works directly against data. Changes to the data model are then moved into the document contents via the data binding mechanism to view controls that are described herein.

Figure 7:
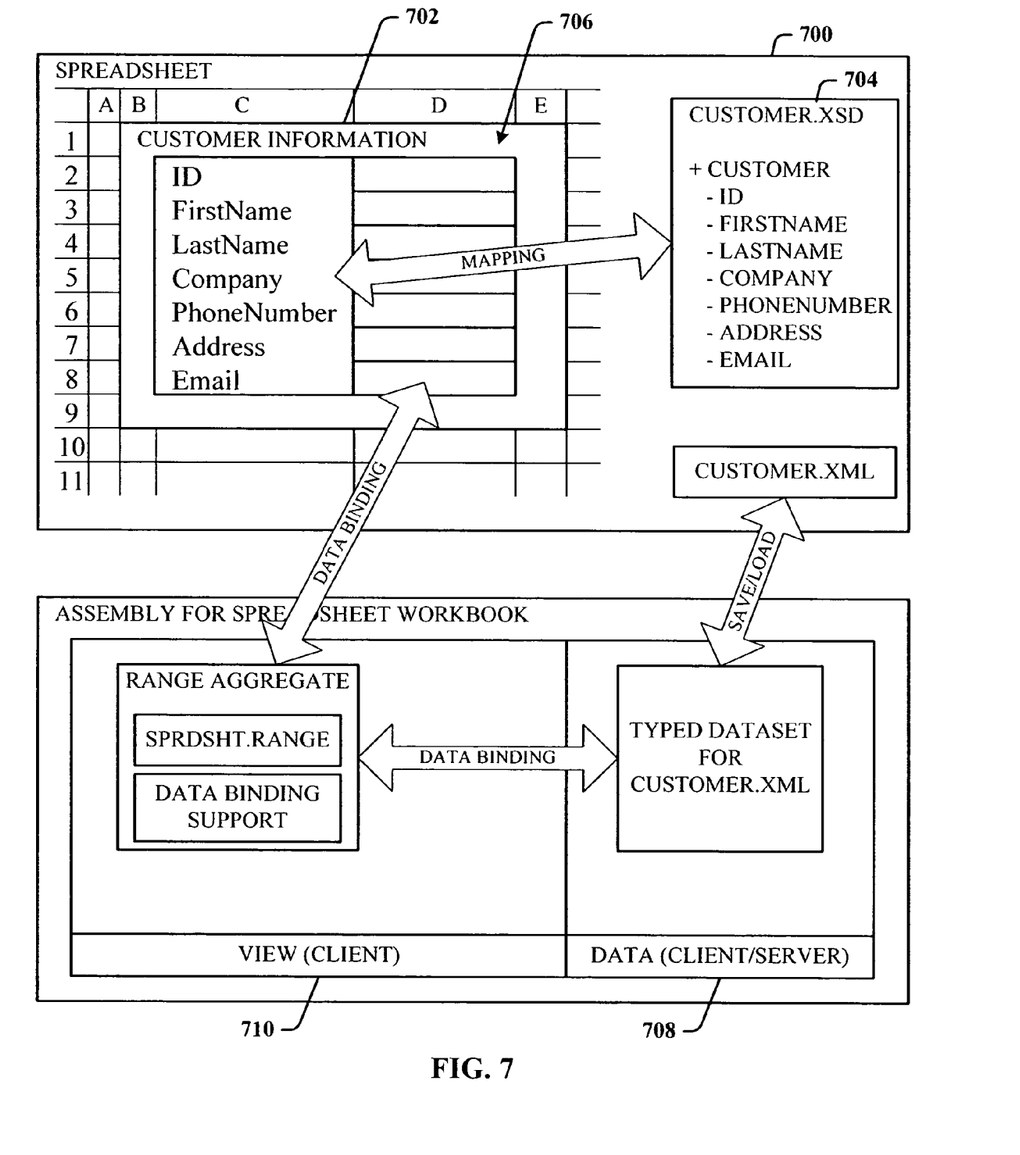
FIG. 7 illustrates a different perspective of the programming model of the present invention.

Referring now to FIG. 7, there is illustrated a different perspective of the programming model of the present invention. A spreadsheet 700 includes a Customer Information block 702 that presents customer information related to a customer ID, FirstName, LastName, Company, PhoneNumber, Address, and EMail address. These are the domain terms that the developer wants to use and are related to the problem to be solved. The developer creates a schema 704 of those domain terms. Here, the schema 704 is a file named Customer.xsd, which can be generated using an XML Schema Definition (XSD) language. Other suitable languages can also be used. The developer performs the mapping of the schema 704 to the corresponding cells 706 of the spreadsheet 700.

A data model 708 receives the customer schema information in the form of an XML file (i.e., Customer.xml) as a typed dataset. The customer.xml file is the data island referred to previously. The data model includes data that can be coded against on the client or the server. A view model 710 includes a view control (not depicted), which adds data binding support to the host object mode, that is created for each cell that has an XML element mapped to it. The developer then codes against the view control, data, data bindings, and host object model. The data model interfaces to the view model via two-way data binding.

Figure 8:
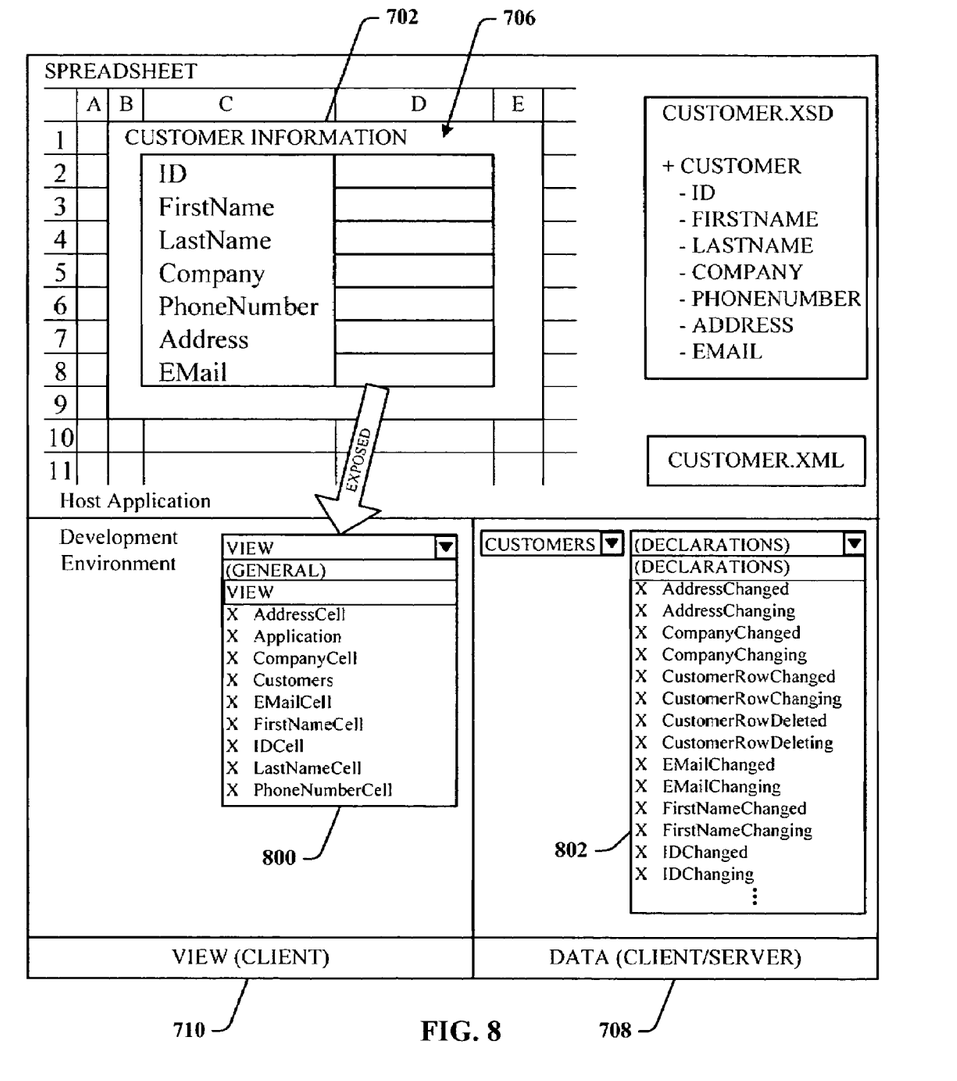
FIG. 8 illustrates a programming model as exposed to a developer.

Referring now to FIG. 8, there is illustrated a programming model as exposed to a developer. The cells 706 of the customer information block 702 are exposed to the developer in the form of a window 800 where each mapped cell is aliased out into the view programming model 710 as a named object (and as a data bindable control). The "Customers" element is a data object that can be coded against on the client or the server.

In the data model 708, the Customer.xml file data can be projected to the developer as a typed dataset that is used to access embedded data in the document on the client or the server. Declarations in the file can be exposed to the developer in declarations window 802. A handler in the code behind the document for an event raised by a server object can access the data model (Customers) on the server, but not the view model (e.g., AddressCell). Since the view model is tied to the host API, the host application has to be running, and it is undesirable to run a heavyweight host like Excel on the server.

Figure 9:
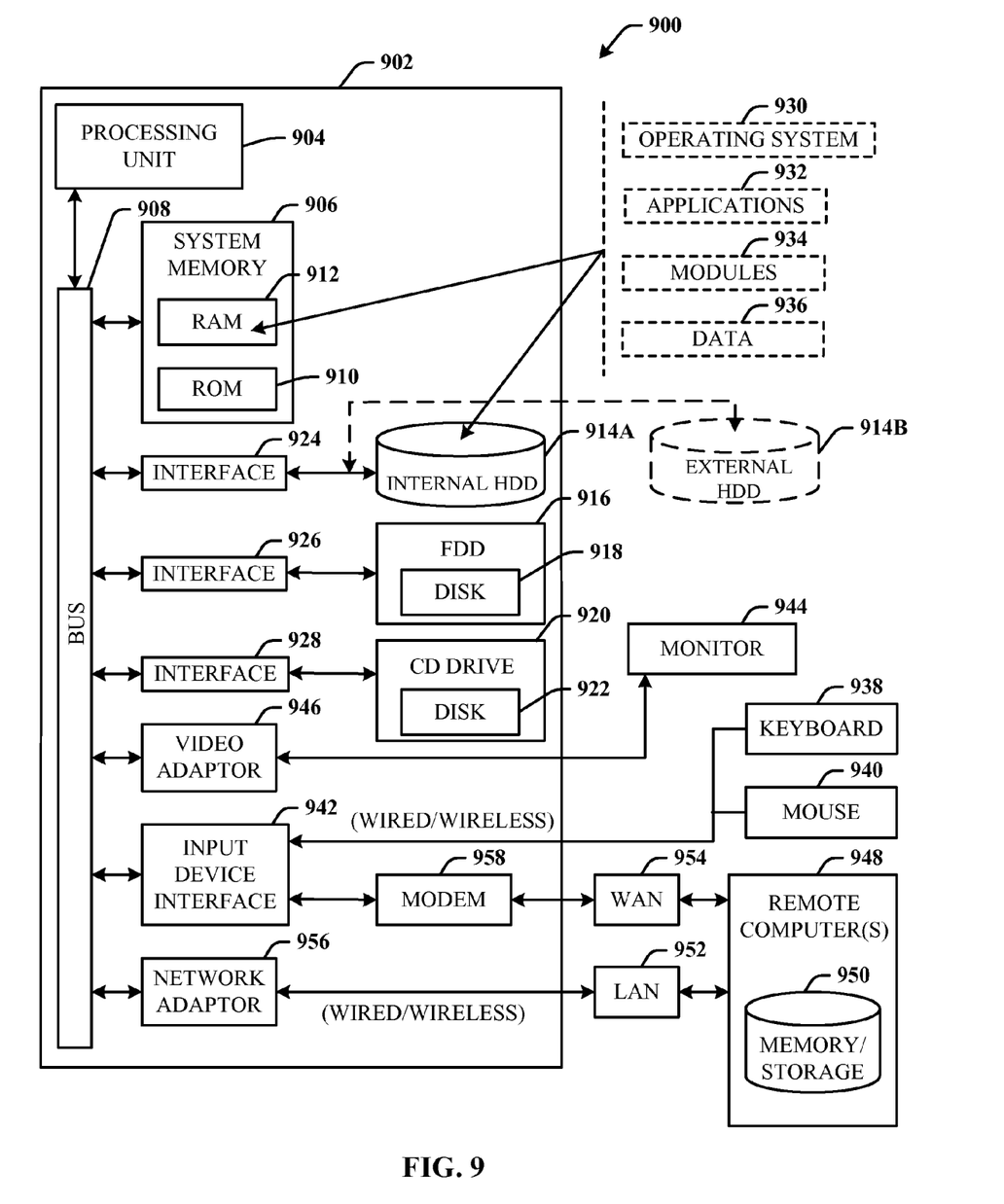
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the present invention, FIG. 9 and the following discussion are intended to provide a brief, general description of a suitable computing environment 900 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an exemplary environment 900 for implementing various aspects of the invention that includes a computer 902, the computer 902 including a processing unit 904, a system memory 906 and a system bus 908. The system bus 908 couples system components including, but not limited to, the system memory 906 to the processing unit 904. The processing unit 904 may be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914A may also be configured for external use (914B) in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 912, including an operating system 930, one or more application programs 932, other program modules 934 and program data 936. All or portions of the operating system, applications, modules, and/or data can also be cached in the RAM 912.

It is appreciated that the present invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but may be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections via wired and/or wireless communications to one or more remote computers, such as a remote computer(s) 948. The remote computer(s) 948 may be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956. When used in a WAN networking environment, the computer 902 can include a modem 958, or is connected to a communications server on the LAN, or has other means for establishing communications over the WAN 954, such as by way of the Internet. The modem 958, which may be internal or external and a wired or wireless device, is connected to the system bus 908 via the serial port interface 942. In a networked environment, program modules depicted relative to the computer 902, or portions thereof, may be stored in the remote memory/storage device 950. It will be appreciated that the network connections shown are exemplary and other means of establishing a communications link between the computers may be used.

The computer 902 is operable to communicate with any wireless devices or entities operably disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10 BaseT wired Ethernet networks used in many offices.

Figure 10:
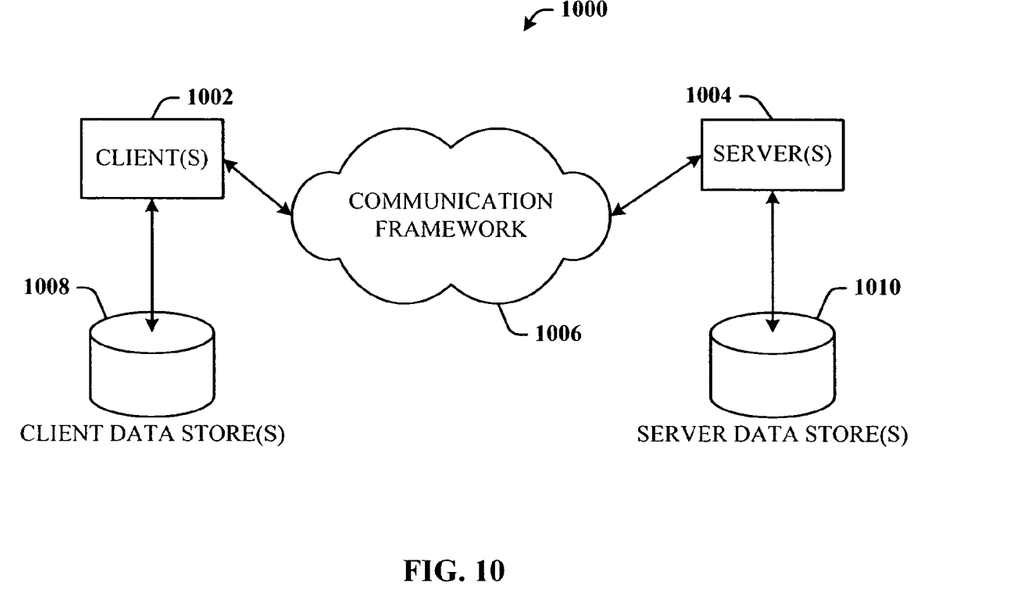
FIG. 10 illustrates a schematic block diagram of an exemplary computing environment in accordance with the present invention.

Referring now to FIG. 10, there is illustrated a schematic block diagram of an exemplary computing environment 1000 in accordance with the present invention. The system 1000 includes one or more client(s) 1002. The client(s) 1002 can be hardware and/or software (e.g., threads, processes, computing devices). The client(s) 1002 can house cookie(s) and/or associated contextual information by employing the present invention, for example. The system 1000 also includes one or more server(s) 1004. The server(s) 1004 can also be hardware and/or software (e.g., threads, processes, computing devices). The servers 1004 can house threads to perform transformations by employing the present invention, for example. One possible communication between a client 1002 and a server 1004 may be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications may be facilitated via a wired (including optical fiber) and/or wireless technology. The client(s) 1002 are operably connected to one or more client data store(s) 1008 that can be employed to store information local to the client(s) 1002 (e.g., cookie(s) and/or associated contextual information). Similarly, the server(s) 1004 are operably connected to one or more server data store(s) 1010 that can be employed to store information local to the servers 1004.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating extension of application functionality by generating one or more application programming interfaces (API) on a computing device that facilitate document development using domain terminology rather than native terminology of a host application, the method comprising:

accessing a schema component, using a processor of the computing device, the schema component including a schema element representative of at least one domain terminology term of one or more problems for solving in a host application, wherein the at least one domain terminology term is different from native terminology utilized in a general API of the host application, wherein the native terminology identifies elements by at least one of cell address or range, and the domain terminology identifies the same elements with textual descriptive terms;

mapping the schema element to a construct of the general API of the host application, using a mapping component executed by the processor such that the domain terminology that includes the textual descriptive terms maps to the native terminology that includes the at least one of cell address or range information, thereby enabling the host application to operate on the domain terminology utilizing the textual descriptive terms; and generating a new API based upon the mapping created by the mapping component, using a generating component executed by the processor, wherein the new API interfacing with the host application and facilitating document development using the textual descriptive terms of the domain terminology in the host application in lieu of the cell address or range information of the native terminology of the host application.

2. The method of claim 1, further comprising using a separation component to separate data from document content.

3. The method of claim 1, further comprising:

using a separation component to generate a data island in a document of the host application;

making the data island in the document of the host application editable without launching of the host application; and synchronizing contents of the data island and the document, such that the document is updated with modified information of the data island when the document is launched within the host application.

4. The method of claim 1, wherein the schema component further facilitates manipulation of a variable without reference to underlying register and/or stack allocations.

5. A computer-readable storage medium having stored thereon computer-executable instructions that, when executed by one or more processors of a computing system, perform a method for facilitating extension of application functionality by generating one or more application programming interfaces (API) that facilitate document development using domain terminology rather than native terminology of a host application, the method comprising:

accessing a schema component, the schema component including a schema element representative of a at least one domain terminology term of one or more problems for solving in a host application, wherein the at least one domain terminology term is different from native terminology utilized in a general API of the host application, wherein the native terminology identifies elements by at least one of cell address or range, and the domain terminology identifies the same elements with textual descriptive terms;

mapping the schema element to a construct of the general API of the host application, using a mapping component, such that the domain terminology that includes the textual descriptive terms maps to the native terminology that includes the at least one of cell address or range information thereby enabling the host application to operate on the domain terminology utilizing the textual descriptive terms; and generating a new API based upon the mapping created by the mapping component, using a generating component, wherein the new API interfacing with the host application and facilitating document development using the textual descriptive terms of the domain terminology in the host application in lieu of the cell address or range information of the native terminology of the host application.

6. The computer-readable storage medium of claim 5, wherein the method further comprises using a separation component to separate data from document content.

7. The computer-readable storage medium of claim 5, wherein the method further comprises:

using a separation component to generate a data island in a document of the host application;

making the data island in the document of the host application editable without launching of the host application; and synchronizing contents of the data island and the document, such that the document is updated with modified information of the data island when the document is launched within the host application.

8. The computer-readable storage medium of claim 5, wherein the schema component further facilitates manipulation of a variable without reference to underlying register and/or stack allocations.

9. A computing system for facilitating extension of application functionality by generating one or more application programming interfaces (API) that facilitate document development using domain terminology rather than native terminology of a host application, the computing system comprising:

one or more processors; and one or more computer-readable storage media having stored thereon computer-executable instructions that, when executed by the one or more processors, cause the computing system to:

access a schema component the schema component including a schema element representative of at least one domain terminology term of one or more problems for solving in a host application, wherein the at least one domain terminology term is specific to a particular document and is different from native terminology utilized in a general API of the host application, wherein the native terminology identifies elements by at least one of cell address or range, and the domain terminology identifies the same elements with textual descriptive terms;

map the schema component to a construct of the general API of the host application, using a mapping component stored on the one or more computer-readable storage media, such that the domain terminology that includes the textual descriptive terms maps to the native terminology that includes the at least one of cell address or range information, thereby enabling the host application to operate on the domain terminology utilizing the textual descriptive terms; and generate a new API based upon the mapping created by the mapping component, using a generating component, wherein the new API interfacing with the host application and facilitating document development using the textual descriptive terms of the domain terminology in the host application in lieu of the cell address or range information of the native terminology of the host application.

10. The computing system of claim 9, wherein executing the computer-executable instructions further causes the computing system to use a separation component to separate data from document content.

11. The computing system of claim 9, wherein executing the computer-executable instructions further causes the computing system to:

use a separation component to generate a data island in a document of the host application;

make the data island in the document of the host application editable without launching of the host application; and synchronize contents of the data island and the document, such that the document is updated with modified information of the data island when the document is launched within the host application.

12. The computing system of claim 11, wherein the schema component further facilitates manipulation of a variable without reference to underlying register and/or stack allocations.

13. The computing system of claim 12, wherein:

the generation component is further used to generate a data programming model and a view programming model that are automatically connected to each other via data binding, the view programming model providing an interface by which the host application operates on the domain terminology;

generating from the schema element, which is a user-defined schema element, code having a form "x.y", wherein "x" is a portion generated from the user-defined schema element, "y" is a property provided by the host application, and "." is a period separating "x" and "y"; and the host application is a spreadsheet that references cell content using cell addresses and cell ranges in its native terminology, and accesses the same cell content using textual heading information using the domain terminology.

\* \* \* \* \*

UNITED STATES PATENT AND TRADEMARK OFFICE
CERTIFICATE OF CORRECTION

PATENT NO.        : 7,694,315 B2                              Page 1 of 1
APPLICATION NO.   : 10/779510
DATED             : April 6, 2010
INVENTOR(S)       : Eric H. Carter et al.

It is certified that error appears in the above-identified patent and that said Letters Patent is hereby corrected as shown below:

In column 10, line 11, delete "mode," and insert -- model, --, therefor.

In column 14, line 28, in Claim 1, after "processor" insert -- , --.

In column 15, line 13, in Claim 5, after "information" insert -- , --.

Signed and Sealed this
Twenty-fifth Day of January, 2011

David J. Kappos
*Director of the United States Patent and Trademark Office*